United States Patent [19]
Sam et al.

[11] Patent Number: 5,181,215
[45] Date of Patent: Jan. 19, 1993

[54] HEATED SOLID STATE LASER

[76] Inventors: Richard C. Sam, 30020 Torrepines Pl., Agoura Hills, Calif. 91301; Kenrick R. Leslie, 516 West Fairview Blvd., Inglewood, Calif. 90302; James E. Goodwin, 1864 Dorrit St., Newbury Park, Calif. 91323

[21] Appl. No.: 796,147

[22] Filed: Nov. 22, 1991

[51] Int. Cl.⁵ .................................................. H01S 3/04
[52] U.S. Cl. ........................................ 372/34; 372/36; 372/33
[58] Field of Search ................................. 372/34, 36, 33

[56] References Cited

U.S. PATENT DOCUMENTS

| | | | |
|---|---|---|---|
| 4,601,038 | 7/1986 | Guch, Jr. | 372/34 |
| 4,809,283 | 2/1989 | Harter | 372/41 |

FOREIGN PATENT DOCUMENTS

| | | | |
|---|---|---|---|
| 0043587 | 3/1983 | Japan | 372/34 |
| 0101885 | 6/1984 | Japan | 372/34 |
| 0204679 | 8/1988 | Japan | 372/34 |

Primary Examiner—Georgia Y. Epps
Attorney, Agent, or Firm—Howard G. Massung

[57] ABSTRACT

An air cooled, flash lamp pumped, solid state laser device wherein heating devices are disposed on the laser rod at both ends to heat and temperature stabilize the laser rod. The solid state, laser rod is longer than the arc length of the flash lamp. The ends of the laser rod can be heated directly by winding heating wire, such as Nichrome, around each end or by applying heat through thermal conductive supports. A feedback loop is provided to maintain temperature of the solid state laser rod, which is preferably Alexandrite, within a desired range of 80° C. to 120° C.

13 Claims, 1 Drawing Sheet

HEATED SOLID STATE LASER

BACKGROUND OF THE INVENTION

1. Field of the Invention

This invention relates to lasers and more specifically to an air cooled solid state laser utilizing a heated laser rod construction.

2. Description of the Prior Art

There is a general recognition in the prior art that many electro-optical components, including various kinds of laser media, require temperature stabilization for optimal performance. Exemplary of laser temperature stabilization apparatus are the following U.S. Pat. Nos. 3,541,300; 4,019,159; 4,387,462; 4,701,607; 4,792,957; 4,809,283; and 4,866,722. Characteristics of Alexandrite lasers, which are particularly suitable for practicing the teaching of the present invention, are described in the following articles: Proceeding of the Society of Photo-Optical Instrumentation Engineers (SPIE). Volume 247, pages 130-36, Jul. 31-Aug. 1, 1980; SPIE Volume 1021, High Power Solid State Laser (1988), pages 61-68; and IEEE Journal of Quantum Electronics, Volume 24, Number 6, June 1988, pages 1151-1166.

SUMMARY OF THE INVENTION

The present invention teaches a flash lamp pumped solid state laser which is air cooled and wherein the ends of the solid state laser rod are heated to bring the laser rod to a desired controlled temperature. In the disclosed device, the solid state laser rods is in contact only with air, except for two rod holders which engage and support the solid state laser rod near its ends. The two laser rod holders allow heat to be applied to the ends of the solid state laser rod and the rod temperature is controlled by a feedback loop. A spring loaded clamp is provided on the end of each rod holder for gripping and supporting the solid state laser rod. The spring loaded clamp provide for good thermal conductivity while allowing for thermal expansion. Heat is conducted to the solid state laser rod from a heated support base by the rod holders and thru spring loaded clamps, attached to the rod holder ends, which engage and support the laser rod. A thermal-couple embedded in the support base moderates temperature and is part of the temperature control feedback loop.

In a second embodiment Nichrome wire is wrapped around the rod and contained within the rod holder to apply heat more directly to the laser rod. The temperature of the Nichrome wire is controlled by a feedback loop which controls temperature by controlling current in the Nichrome wire. Both embodiments of the invention can maintain and stabilize the solid state laser rod in the 80° C. to 120° C. temperature range within a short time, normally less than 5 minutes, with a very small power input, 10 to 50 watts, supplied to the heating loop.

With water cooled, solid state laser devices, the laser rod temperature is usually controlled by regulating the temperature of the water which is directly in content with the laser rod. For a lightweight, fieldable laser unit water cooling is not acceptable. The present invention allows more efficient and reliable operation of an air cooled solid state laser, preferably of Alexandrite.

BRIEF DESCRIPTION OF THE DRAWINGS

For a better understanding of the invention reference may be had to the preferred embodiments exemplatory of the invention shown in the accompanying drawings in which.

DETAILED DESCRIPTION OF THE PREFERRED EMBODIMENTS

Figure 1:
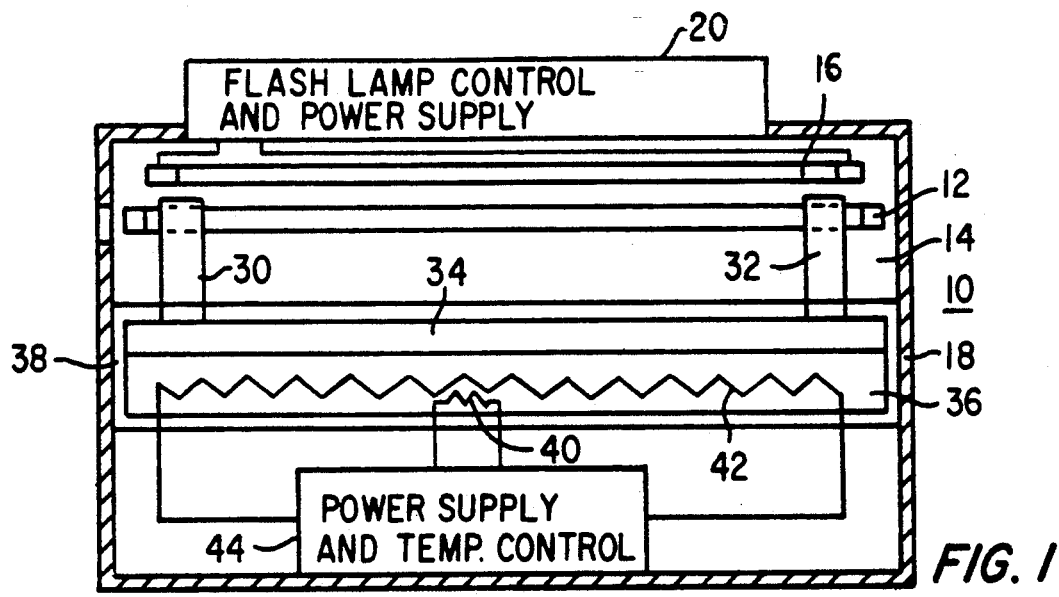
FIG. 1 is a view, partially in section, of a solid state laser device constructed according to the present invention.

Referring now to the drawings and FIG. 1 in particular there is shown a solid state laser device 10 constructed according to the teaching of the present invention. Laser device 10 is air cooled and utilizes an Alexandrite laser rod 12. Solid state laser rod 12 is disposed in a laser pump chamber 14 which also includes, as is well known in the prior art, a flash lamp 16 which provides excitation for laser rod 12. An enclosure 18 is provided for the Alexandrite laser device 10. A control and power supply 20 for flash lamp 16 is supported in enclosure 18. The Alexandrite laser rod 12 is cooled only by air.

Laser rod 12 is in contact only with air except for two rod holders 30, 32 which extend from a heated support base 34. The rod holders 30, 32 are formed from a metallic, good thermal conductive material, to conduct heat to the supported ends of laser rod 12. The rod holders 30, 32 and base 34 are preferably formed from aluminum. Base 34 is in good thermal contact with a thermofoil heating element 36. A layer of installation 38 is provided around base 34. A thermal couple 40 is disposed for sensing the temperature of base 34. A heating element 42 is provided in thermofoil 36 for heating base 34. Heating element 42 and temperature sensor 40 are connected to a power supply and temperature control 44 which is supported within enclosure 18. Power supply and temperature control 44 are used to stabilize the temperature of laser rod 12 within a range of 80° C. to 120° C. Rod holders 30 and 32 protrude from base 34 and conduct heat to the solid state laser rod 12. Spring loaded rod holder clamps, which will subsequently be described in more detail, are attached to the free ends of rod holders 30, 32 engage and support laser rod 12. The thermal couple 40, embedded in base 34, monitors base temperature and forms part of a temperature control feedback loop of the type well known in the prior art. There is a good temperature distribution along the heated laser rod 12. With this construction laser rod 12 can be heated to a desired temperature within a short time of less than 5 minutes using a small heating power input of 10 to 50 watts.

Figure 2:
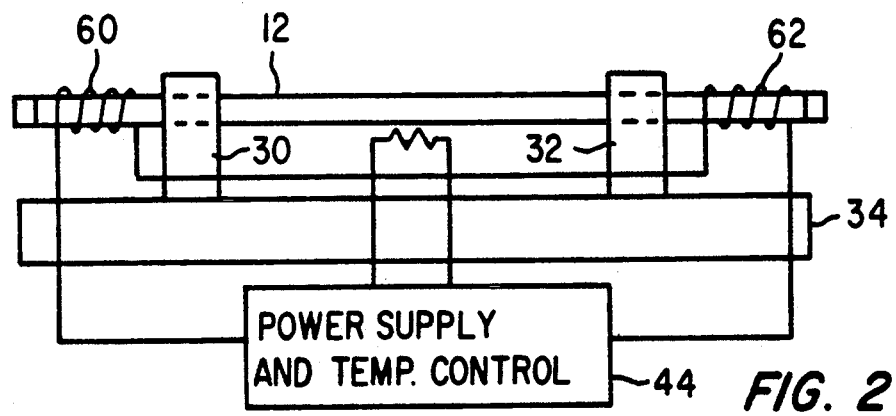
FIG. 2 is a view of another embodiment of the invention, with some portions of the solid state laser device deleted, showing direct heating of the ends of the solid state laser rod.
Figure 3:
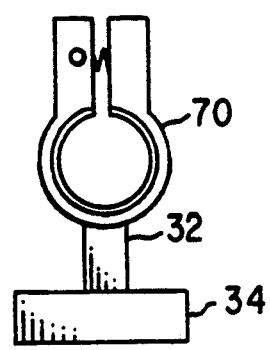
FIG. 3 is an end view of a portion of the laser apparatus of FIG. 1 showing the base and a laser rod holder; and, FIGS. 4 and 5 are views of a spring loaded clamp, which is attached to the free end of the laser rod holder, for engaging and supporting the solid state laser rod.
Figure 4:
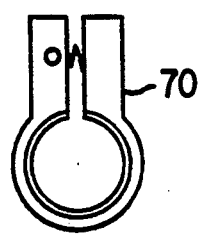
Figure 5:
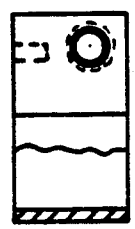

Referring now to FIG. 2 there is shown another embodiment of the present invention wherein the thermofoil heater 36 of FIG. 1 is replaced with electrical heating coils 60 and 62 disposed around the ends of laser rod 12. In this embodiment laser rod 12 is directly heated thus eliminating the need to first heat the aluminum base plate 34. With this embodiment faster heating with a lower heating power input can be obtained. The Nichrome wire, which forms heating loops 60, 62 can be contained within or separate from rod holders 30, 32. Current is applied to heat the Nichrome wire and current is controlled by a feedback loop through power supply and temperature control 44 to maintain the solid state laser rod at the desired temperature. The heating coils 60, 62 are disposed on the laser rod 12 at both ends to heat and temperature stabilize the laser rod 12.

Referring now to FIGS. 3 thru 6 there is shown a spring loaded clamp 70. A spring is provided to bias clamp 70 closed to provide for good thermal conductivity engagement with laser rod 12 while allowing for thermal expansion.

The gain characteristics of Alexandrite lasers change with temperature. In a water cooled laser device, the rod temperature is usually controlled by regulating the water temperature which is directly in contact with the rod. For a lightweight and fieldable unit water cooling is not acceptable. Without active temperature control of the laser rod 12, the performance characteristics of the laser will be depending on the ambient temperature and therefore unreliable. Since the laser rod temperature will usually be at a temperature much lower than its optimally performance temperature the Alexandrite laser will also be inefficient. The present invention permits operation of the Alexandrite laser more efficiently and reliably compared with prior air cooled solid state laser rod devices. The present invention is particularly suitable for hand held laser devices that operate single shot or burst mode.

The present invention improves efficiency and reliability of the solid state laser thus permitting the laser device to be smaller, lighter in weight, use less power and be cheaper to upkeep and maintain. In the disclosed invention, the solid state laser rod is approximately 1 inch longer than the flash lamp arc length. The U shaped laser rod clamp is attached in close proximity to the end of the laser rod 12. The U shaped clamping device is spring loaded so good thermal contact is established but allowance is made for differences in thermal expansion. The pair of laser support rods 30, 32 are located precisely with respect to a reflector which is referenced to the end caps but thermally insulated therefrom.

We claim:

1. A flash lamp pumped, air cooled, solid state laser apparatus comprising:
   a laser pump chamber;
   a flash lamp disposed within said laser pump chamber;
   a solid state laser rod disposed within said laser pump chamber;
   a pair of thermal conductive supports extending into said laser pump chamber and engaging said solid state laser rod in proximity to its ends for supporting said laser rod; and
   means for heating said pair of thermal conductive supports so as to heat said laser rod by applying heat in proximity to its ends.

2. Apparatus as claimed in claim 1 wherein said solid state laser rod is Alexandrite.

3. Apparatus as claimed in claim 1 wherein said pair of supports are connected to a support base and including means for heating said support base to a predetermined temperature.

4. Apparatus as claimed in claim 1 comprising spring loaded clamping means attached to the ends of said support members for securely engaging and supporting said solid state laser rod while allowing for thermal changes.

5. Apparatus as claimed in claim 1 comprising temperature controlled means for controlling the temperature of said solid state rod within a range of 80° C. to 120° C.

6. A handheld, flash lamp pumped, air cooled, solid state laser apparatus comprising:
   an enclosure;
   a flash lamp disposal within said enclosure;
   a solid state laser rod disposed within said enclosure in proximity to said flash lamps;
   thermal conductive supports engaging said solid state laser rod near its ends for supporting said solid state laser rod;
   a thermal conductive base having said conductive supports attached thereto;
   means for heating said thermal conductive base to a predetermined temperature.

7. Apparatus as claimed in claim 6 wherein said solid state laser rod is longer than the arc length of said flash lamp.

8. A hand held, flash lamp pumped, solid state laser apparatus comprising;
   an enclosure;
   a flash lamp disposed within said enclosure;
   a solid state laser rod disposed within said enclosure in proximity to said flash lamps;
   heating means for applying heat to both ends of said solid state laser rod; and,
   temperature control means for controlling the heat applied to said solid state rod.

9. Apparatus as in claim 8 wherein said means for applying heat comprises heated wire disposed around each end of said solid state laser rod.

10. Apparatus as claimed in claim 9 wherein said heating wire is Nichrome.

11. Apparatus as claimed in claim 9 wherein said solid state laser rod is formed from Alexandrite.

12. Apparatus as claimed in claim 9 wherein said solid state laser rod is longer than the arc length of said flash lamp.

13. A method of controlling the temperature of the elongated laser rod in an air cooled solid state laser apparatus comprising the steps of:
   a. providing heating elements on both ends of the elongated laser rod;
   b. using the heating elements to heat both ends of the elongated laser rod;
   c. sensing a temperature of the apparatus which is a function of the laser rod temperature; and
   d. using the sensed temperature to control the heating elements to maintain the laser rod within a desired temperature range.

* * * * *